United States Patent [19]
Ing et al.

[11] Patent Number: 5,607,742
[45] Date of Patent: Mar. 4, 1997

[54] GROUND ENVIRONMENT MATS

[76] Inventors: Dan N. Ing, Windover, Farm Lane, East Horsley, Surrey, KT24 5AB; Anthony E. Harris, 15 Sunningdale Walk, Bedford, MK41 8BA, both of Great Britain

[21] Appl. No.: 132,255

[22] Filed: Oct. 6, 1993

[30]  Foreign Application Priority Data

Oct. 6, 1992 [GB] United Kingdom .................. 9220930

[51] Int. Cl.⁶ ........................................... B32B 5/00
[52] U.S. Cl. ........................... 428/98; 428/591; 428/592; 428/593; 428/613; 428/615; 428/120; 428/188; 244/114 B
[58] Field of Search .................................. 428/593, 610, 428/613, 98, 591, 592, 615, 120, 188; 244/114 B

[56]  References Cited

U.S. PATENT DOCUMENTS 3,649,724  3/1972  Rembert et al. ........................ 264/22

FOREIGN PATENT DOCUMENTS

| | | |
|---|---|---|
| 497646 | 8/1992 | European Pat. Off. . |
| 1219419 | 5/1960 | France . |
| 1319766 | 1/1963 | France . |
| 1549646 | 12/1968 | France . |
| 371823 | 10/1993 | Switzerland . |
| 750890 | 6/1956 | United Kingdom . |
| 867944 | 5/1961 | United Kingdom . |
| 886204 | 1/1962 | United Kingdom . |
| 921400 | 3/1963 | United Kingdom . |
| 1207188 | 9/1970 | United Kingdom . |
| 1484997 | 9/1977 | United Kingdom . |
| 2178381 | 2/1987 | United Kingdom . |

*Primary Examiner*—Christopher Raimund
*Attorney, Agent, or Firm*—Cushman, Darby & Cushman IP Group of Pillsbury Madison & Sutro LLP

[57]  ABSTRACT

A ground environment mat for VSTOL aircraft and the like, comprising drag elements controlling the effect of laterally transmitted ground jets resulting from jet entry to the mat, so as to reduce hot gas and debris ingestion by the aircraft's air intakes, suck-down on the aircraft's surfaces and ground or deck erosion or heating. The drag elements may comprise or perforated metal twisted flat strips tubes or perforated elements hingedly attached to a backing layer.

17 Claims, 5 Drawing Sheets

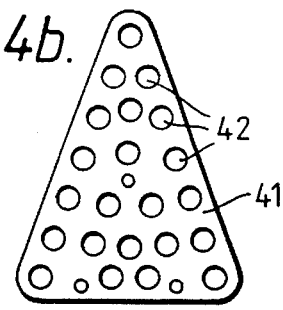
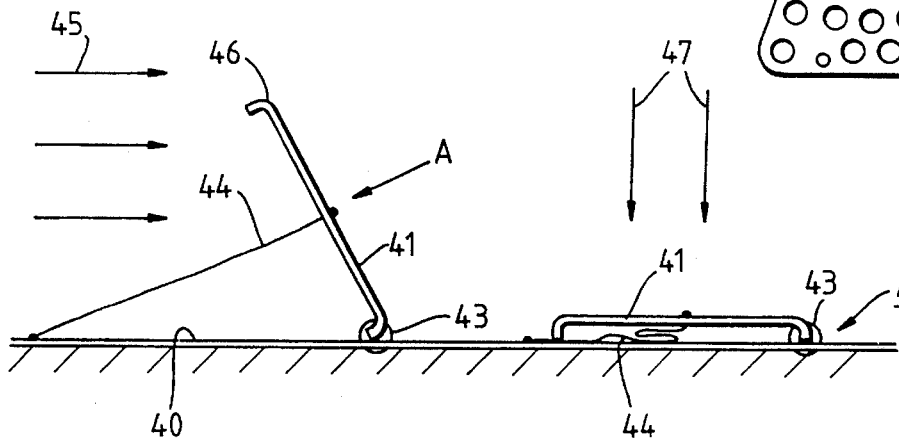
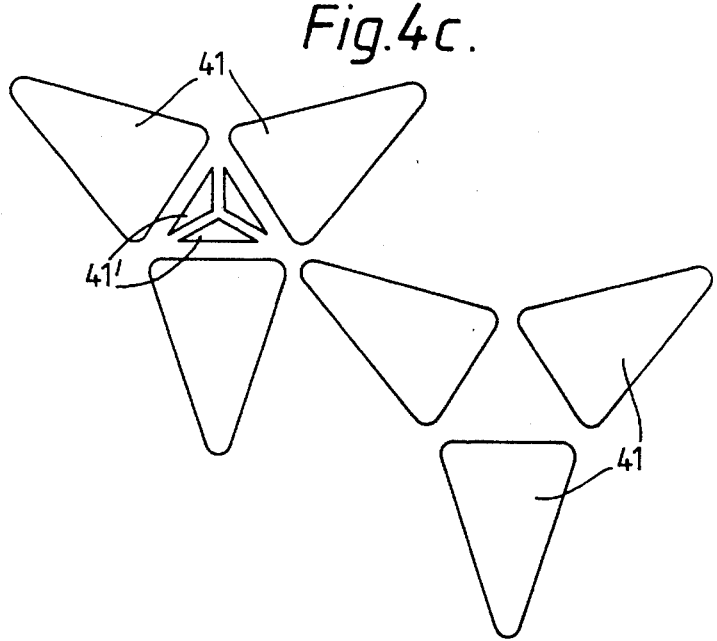
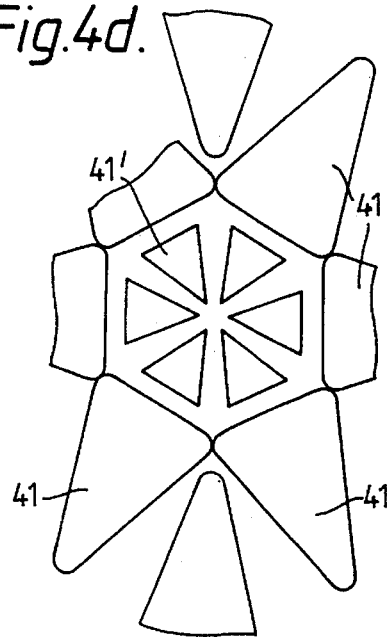

GROUND ENVIRONMENT MATS

FIELD OF THE INVENTION

This invention relates to ground environment mats for vertical/short take-off and landing (VSTOL) aircraft operations and particularly, although not exclusively, to such ground environment mats for operations of VSTOL aircraft of the type which use one or more gas turbine engines for wing-borne flight and, by vectoring the engines exhaust efflux downwardly and/or by driving one or more fans which exhaust downwardly, for engine-borne flight.

BACKGROUND OF RELATED ART

During take off and landing, the hot gas efflux, which we will refer to hereinafter as the jet or jets, from the lifting engines or fans of a VSTOL aircraft strike the ground and produce complex fluid flows around the aircraft, often resulting in substantial and unfavourable aerodynamic and environmental effects on aircraft operations.

The effects caused by the interaction between the ground and the VSTOL aircraft's jets include:
1. Ground jet sheets
2. Fountain flows due to ground jet interaction where there are jets from two or more exhaust sources on the aircraft
3. Hot gas ingestion of the engine or fan exhaust by the air intakes
4. Downwash induced mainly by ground jet entrainment, on the aircraft's surfaces ("suck-down")
5. Ground or deck erosion and/or heating
6. Debris and dust ingestion into air intakes
7. Thermal and acoustic fatigue on the aircraft structure and equipment Re-circulation of hot exhaust gases into the engine intakes can result in large thrust losses, or even compressor stall. Variations of aircraft lift due to downwash induced by ground jet entrainment also degrade VSTOL performance. The hot upwash flows and the sound pressure generated by the exhaust jets and their interaction with the ground may result in thermal and acoustic fatigue of the aircraft structure and equipment. Ground erosion due to the high temperature, high pressure jets, ingestion of debris thrown up by the ground impinging jets and the reduction in pilot visibility due to dust cloud creation are other major problems. These latter problems are exacerbated when the VSTOL aircraft is operating from non-permanent surfaces such as desert or natural terrain, whilst some of the problems above arise in ship-borne or more conventional operating environments.

To counter these problems it is known to use prefabricated aluminium sheeting to protect the ground surface during VSTOL aircraft operations on land. For ship-borne operations, an anti-skid surface known as "Camrex" is painted onto thick steel plate for protection of the ships decking against erosion and heat. These known protective measures are not designed to improve aircraft performance in terms of reduced hot gas ingestion, ground effect lift loss, and debris/ dust ingestion.

The problems mentioned above will be further exacerbated by the introduction of VSTOL aircraft with high temperature, high pressure exhausts.

SUMMARY OF THE INVENTION

It is an object of the present invention to provide landing surfaces which will overcome the problems listed above.

It is a further object of the present invention to provide both permanent and portable devices which will overcome the problems listed above.

According to the present invention there is provided a ground environment mat comprising a plurality of rigid discrete drag elements defining a single layer means for permitting entry of and controlling ground jet flows in all azimuth directions. Each discrete drag element spans the height of the layer means whose upper boundary is sufficiently porous to permit jet entry into the layer means while subsequently substantially preventing ground jet escape therefrom.

In use the ground environment mat is laid on the ground so that its upper surface will receive the jet or jets from a VSTOL aircraft taking off from or landing upon the mat. The upper surface of the mat allows the jet to reach the porous core element which slows the jet down and removes energy from it. The core element allows lateral flow of the jet throughout the mat to exhaust from the mat edges.

The ground environment mat is preferably constructed from material capable of withstanding the weight of the VSTOL aircraft before take-off and after landing.

Provided the ground on which the mat is located is impermeable the jet from the VSTOL aircraft will be diverted by the ground to travel laterally through the layer of discrete drag element means. Where the ground is a permeable, non-permanent, surface such as desert an alternative form of the mat is used. In this case at least the mat additionally comprises a lower substantially impermeable surface.

The mat may be made of a flexible light-weight material so that it is transportable.

The drag elements may comprise porous metal tubular, deep drawn, pressed or extruded perforated metal sections.

The mat may comprise a plurality of mat elements each comprising an upper porous surface and a high drag element demountably linked to neighbouring mat elements.

BRIEF DESCRIPTION OF THE DRAWINGS

Embodiments of the invention will now be described by way of example only and with reference to the following drawings of which:

FIG. 1a shows the jet/ground interaction without a ground environment mat and FIG. 1b shows the jet/ground interaction with a ground environment mat in place;

FIGS. 2a to 2c illustrate light weight ground environment mats; FIG. 2a is a perspective view of a light-weight ground environment mat; and, FIG. 2b is a cross sectional view along the lines AA of FIG. 2a of one form of ground environment mat;

FIG. 3a is a perspective view of one form of ground environment mat; FIG. 3b is a cross section along the lines BB of FIGS. 3a; FIG. 3c is a cross section of an alternative construction of mat along the lines BB of FIGS. 3a; FIG. 3d is a plan view of a further form of ground environment mat; FIG. 3e is a view along the arrow P of FIG. 3d; and, FIGS. 3f, 3g and 3h are sectional views along the lines X—X, Y—Y and Z—Z respectively of FIG. 3e; and, FIGS. 4a to 4d illustrate collapsible forms of ground environment mats; FIG. 4a is a sectioned side view of part of a ground environment mat; FIG. 4b is a view in the direction of arrow A of FIG. 4a of an element of a ground environment mat; FIG. 4c is a plan view of part of one form of the ground environment mat shown in FIG. 4a; and, FIG. 4d is a plan view of part of a further form of the ground environment mat shown in FIG. 4a.

DESCRIPTION OF PREFERRED EMBODIMENTS

Figure 1A:
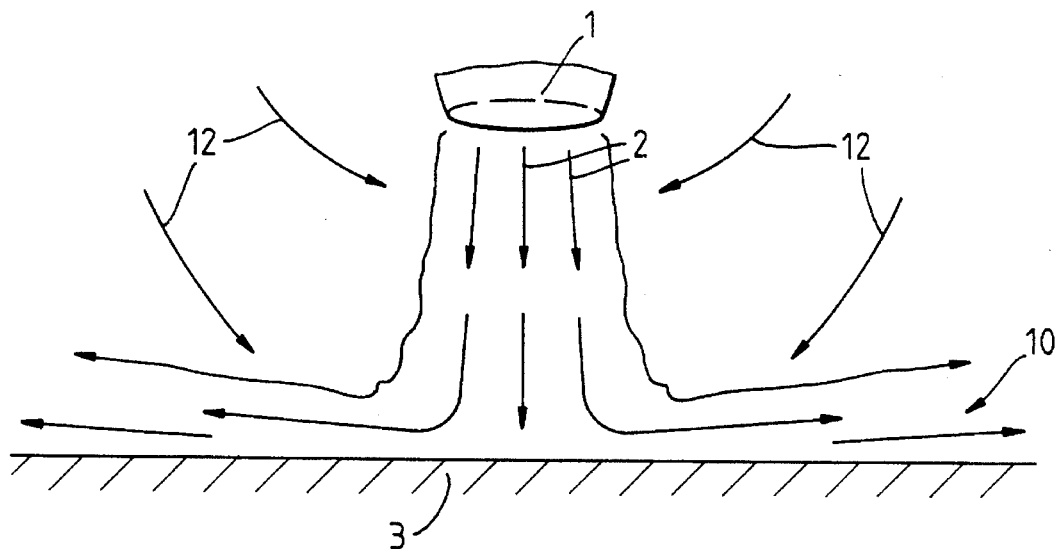
FIGS. 1a and 1b are schematic side elevation views of a VSTOL jet operating in a ground environment illustrating the principles of the invention.

In FIG. 1a a downwardly directed exhaust nozzle 1 of a gas turbine engine or fan of a VSTOL aircraft (not shown) directs the gas turbine engine or fan exhaust efflux, or jet, 2 towards a ground surface 3 during vertical take-off or landing operations. The ground 3 diverts the jet 2 into radially expanding ground jets 10. The ground jets 10 have a velocity profile in a direction normal to the ground which is zero at ground level, peaks to a high maximum at points close to the ground and decays to zero at higher levels. The jet 2 also entrains ambient air resulting in a downward ambient airflow 12.

The high pressure jet 2 may cause ground erosion and heating at its point of impact with the ground. The ground jets 10 may throw up dust and debris which may get into engine air intakes (not shown) and damage the engine. Where the aircraft is fitted with more than one nozzle 1 the ground jets 10 from each will collide giving rise to fountain flows which may collide with the underside of the aircraft causing damage as well as diverting part of the hot fountain flows along the underside into the air intakes resulting in hot gas ingestion. Hot gas ingestion can also be caused by the buoyancy effect of the hot ground jets and by the lifting up of the ground jets in a headwind situation. The downwash produced by the entrained air 12 causes suckdown on the aircraft's surfaces in turn requiring greater thrust from the gas turbine engines or fans in order to keep the aircraft airborne.

Figure 1B:
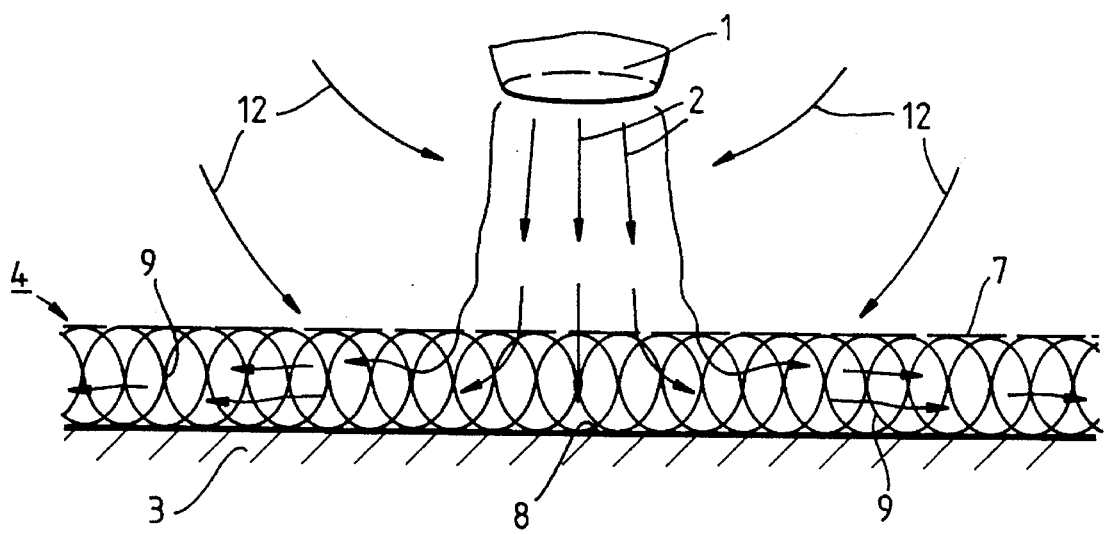

FIG. 1b illustrates the use a ground environment mat to overcome some of the problems listed with reference to FIG. 1a. In FIG. 1b a ground environment mat 4 comprises of a permeable upper layer 7, an impermeable lower layer 8, and drag elements 9 sandwiched between the layers 7 and 8.

In operation when the exhaust jets 2 impinge on the mat 4, the development of the resulting ground jets 10 will be substantially retarded by the porous upper layer 7 and the porous or mesh drag elements 9. The rapid loss of momentum in the ground jets 10 means that the jet velocities inside the mat will be significantly lower than those which would arise without the mat. The energetic, peaky ground jet velocity profile described with reference to FIG. 1a is replaced by a more uniform jet velocity profile and a less energetic flow. This large reduction of the ground jet energy greatly reduces the downwash of ambient air 12 entrained into the jets, hence reducing the lift loss in ground proximity.

The impermeable nature of the lower surface 8 of the ground environment mat 4 prevents erosion of the surface of the ground below the mat and acts to contain the ground jets 10 within the mat. The upper surface 7 is sufficiently porous to allow the impinging jet 2 to pass through relatively unhindered, but extracts energy from it and helps to inhibit hot gases from escaping up into the region beneath the aircraft which is especially important near the aircraft air intakes. There is also the potential for a reduction in hot gas ingestion when using the mat due principally to three factors:

1. Fountain flow, identified as a powerful potential HGI source, will be suppressed due to weaker ground jets 10 and the resistance due to the upper surface 7 of the mat 4.

2. Control of the hot jet flow path inside the mat by appropriate design of the interior elements of the mat (described in more detail below) to ensure that hot gases do not rise towards the aircraft's intakes.

3. Heat absorption and dissipation properties of the mat components.

Dust and debris are suppressed owing to the much reduced flow velocities, both along the mat 4 and along the ground surface outside the perimeter of the mat.

We now describe variants of the ground environment mat design.

Figure 2A:
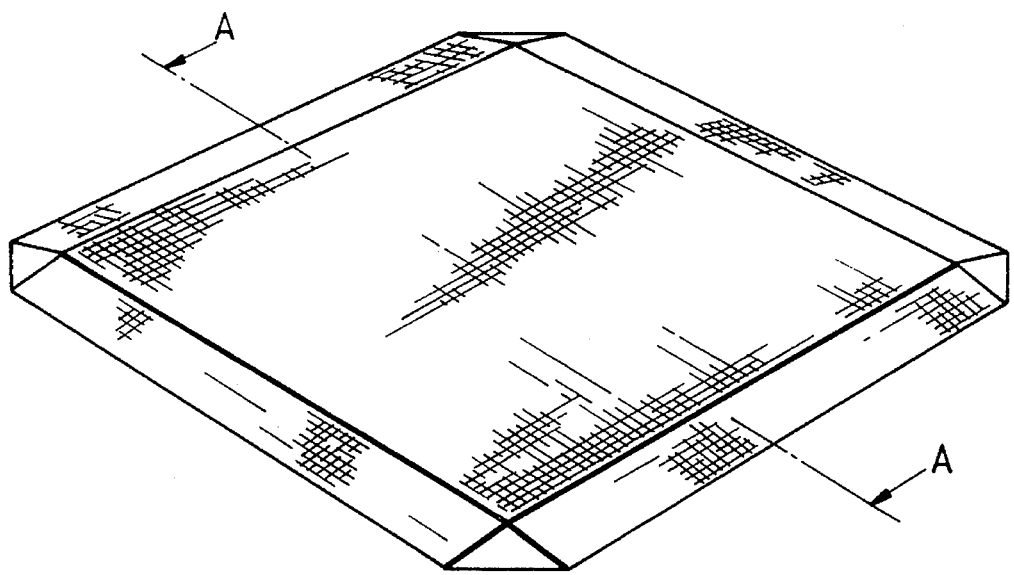

In FIG. 2a a ground environment mat comprises a mat of approximately 25 meters by 25 meters designed to capture jets from a VSTOL aircraft operating in the height range 0–10 meters.

Figure 2B:
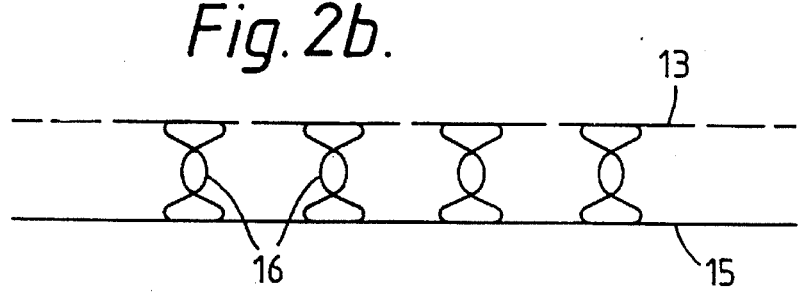

In FIG. 2b an alternative mat construction is shown comprising high-drag elements 16 consisting of twisted flat strips of typically metallic or composite materials attached to the lower layer 15 and upper layer 13. These flat strips have a full twist each and are placed in a uniform distribution for example at roughly 100 millimeter centres but probably at least 10 millimeters. Twist in the strips adds stiffness and makes the drag elements more multi-directional to cope with different ground jet directions.

The mat, in the form shown in FIG. 2b, is made of heavy duty, temperature resistant materials. It is designed to be readily deployable and packable for storage or transport. Fixation points (not shown) are provided over the area of the mat to enable the mat to be secured to the ground in use by suitable means such as pins or bolts (not shown). If the mat is to be deployed by air-dropping, at remote sites fixation to the ground may be made automatic using explosive fittings.

Figure 3A:
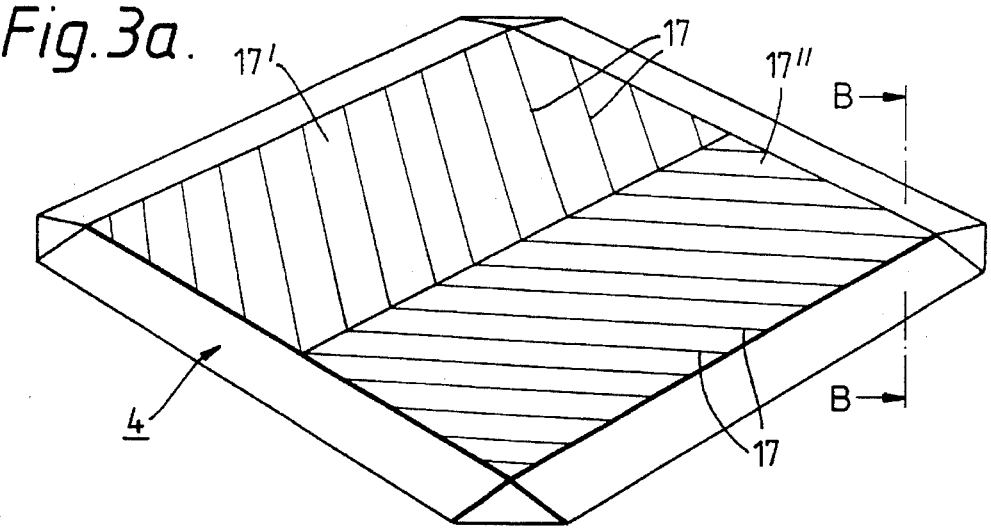
FIGS. 3a to 3h illustrate several versions of ground environment mats.

Other forms of ground environment mats are shown in FIG. 3a to 3h. In FIG. 3a a ground environment mat 4 comprises a plurality of parallel heavy-duty metal tubular sections 17 arranged in two groups 17' and 17" which intercept in "v" formation at a center line 5 of the mat 4. As will be seen in FIG. 3b which is a cross section on the line BB of FIG. 3a the sections 17 have porous upper and side surfaces of the sections but impermeable lower surfaces 18. The side surfaces of the sections 17 may assist with the directional channelling of the hot gases. The sections 17 are mounted on a heavy-duty metal impermeable lower layer 20. In an alternative construction shown in cross section in FIG. 3c the tubular sections 17 are sandwiched between a heavy-duty porous metal upper layer 19 and the lower layer 20.

Many variations in the constructions shown are possible, for example the upper and/or lower layers 19 and 20 may be dispensed with, provided the metal tubular sections 17 are held together in their parallel configuration for example by bolts, belts or adhesive bonding.

Figure 3B:
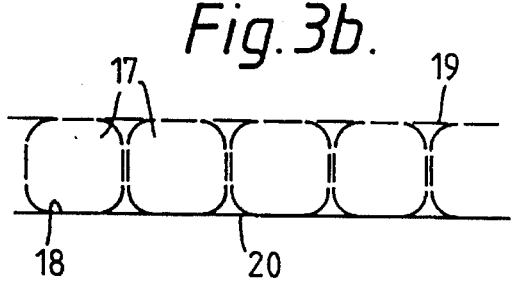
Figure 3C:
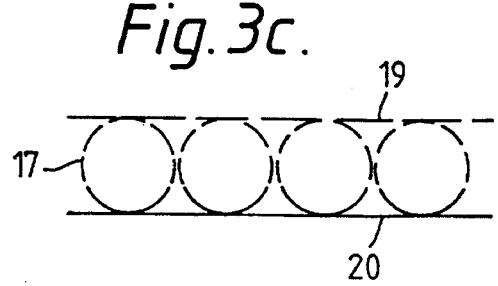
Figure 3E:
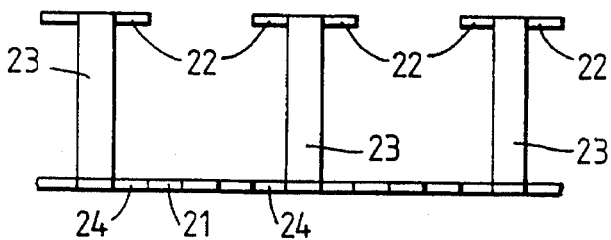
Figure 3D:
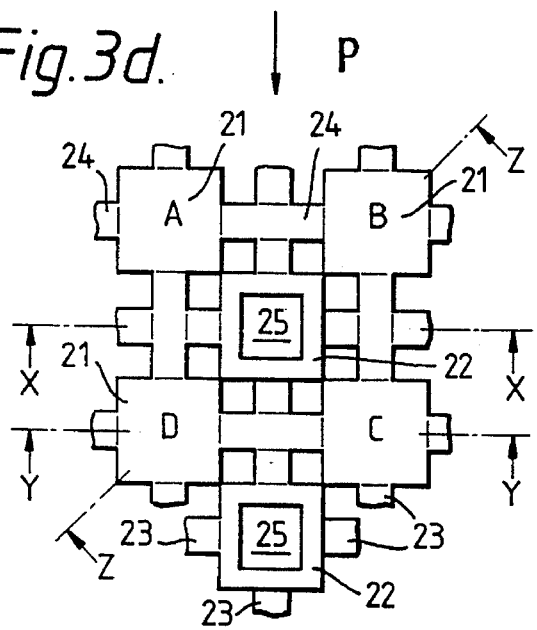
Figure 3F:
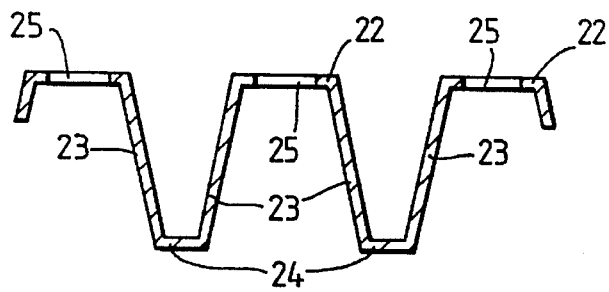
Figure 3G:
Figure 3H:
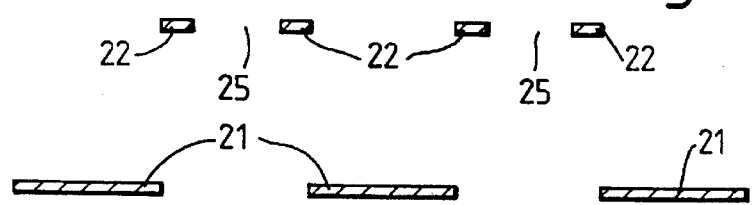

The tubular sections 17 of FIGS. 3a, 3b and 3c serve a number of functions; as drag elements to suppress high velocity ground jets (10 in FIG. 1), to channel the hot exhaust away from the aircraft particularly away from the vicinity of air intakes; to assist heat dissipation; and, to support the top layer 19 (when used) which can be made using a heavy-gauge porous steel sheet construction.

An alternative form of construction shown in FIGS. 3d to 3h includes a plain metallic, plastics or composite sheet which is punched and drawn (or deep drawn) to create upper and lower square shaped elements 22 and 21 respectively linked by strip like armatures 23 and 24 respectively. The upper elements or caps 22 are porous in that each has a square hole 25 punched therein. The armatures or stringers 23 provide in use directional aerodynamic drag response.

The pitch between elements and the dimensions of the mat are chosen to give strength and stability under aerodynamic and aircraft wheel footprint loads. The pitch must be small enough to make a practical platform for personnel to walk on. The armatures 23 may be vertical or inclined as shown and the angle of inclination may be determined by structural and aerodynamic design considerations allied to material properties.

The mats shown in FIGS. 3a to 3h may be made of a plurality of similar individual sections linked together to form a mat of the required overall dimensions. This modular form of construction also allows individual sections to be taken out for replacement or service. Moreover sections of different porosity can be arranged in patterns of directional or isotropic drag elements as required to optimize performance of the mat.

The heavy duty ground environment mats shown in FIG. 3a to 3h may range in size from that shown in FIG. 2a and 2b to structures significantly larger to permit multi-aircraft operations.

A ground environment mat in collapsible form is shown in FIGS. 4a to 4d. In this form the mat 4 comprises a substantially impermeable lower backing layer 40 on which are hingedly mounted a plurality of light weight high drag elements 41. The drag elements may be any convenient shape. In our example they are triangular and have a plurality of holes 42 passing there through. Each triangular drag element 41 is hinged to the lower layer 40 by means of a cleat 43 and normally lies flat on the lower backing layer 40 shown in the right hand side of FIG. 4a. When a VSTOL aircraft approaches the mat its downwardly directed jets impinge on the drag elements 41 and because of their profile cause them to pivot about their cleats 43 and assume an upright position as shown in the left hand side of FIG. 4a where they are restrained by ties 44. In this position, it will be appreciated, the drag elements 41 together constitute a high drag core element through the holes 42 of which ground jets 45 may pass laterally in the advantageous manner described with reference to FIG. 1b above.

The drag elements 41 may be arranged on the lower backing layer 40 in symmetrical sets of three, with the bases of the triangles forming a triangular pattern, and with elements of neighbouring sets interlaid between adjacent pairs of elements, as shown in FIG. 4c. Smaller triangular drag elements 41', with different drag properties, may then be similarly grouped within the triangular area formed by the bases of the larger drag elements 41. Alternatively, the triangular drag elements 41 may be arranged on the lower backing layer 40 in symmetrical sets of six, with the bases of the triangles forming hexagons, again with groups of smaller drag elements 41' within those hexagons, as shown in FIG. 4d.

It is anticipated that in use 30 to 50% of the triangular elements 41 will deploy in the jet flow 45, but all will lay flat before take-off or after landing to support the aircraft footprint, ground crew or vehicles.

For single military fighter aircraft vertical take-off or landing operations a minimum mat area of approximately 25 meters by 25 meters is envisaged although the bigger the mat the greater could be the pilot's freedom to manoeuvre the aircraft close to the ground without hazard. The smallest mat which can be envisaged is one which is not smaller than the plateform area enclosed by straight lines joining the extremities of the main lifting devices of the aircraft.

The, heavy-weight ground environment mats, heavy-weight should have a thickness in the region of 5–60 cm. The porosity of the drag elements and the upper layers in the embodiments shown is critical to the ground environment mats performance. The design of the drag elements is selected to be in the region of 70–99% (volumetric) and in any event high enough to avoid spill-over of the ground jets (see 10 in FIG. 1) above the mat. The porosity of the upper layer should be at least 20% (open area).

We claim:

1. A ground environment mat comprising:

a single porous layer means for permitting vertical entry of and controlling ground jet flows in all horizontal radial directions within said single porous layer means, said single porous layer means having a height and comprising:

an upper surface, said upper surface being sufficiently porous to permit vertical jet flow entry into said single porous layer means while subsequently preventing substantially a ground jet flow escape therefrom, a lower surface, and a plurality of discrete drag elements, each of said plurality of discrete drag elements spanning said height of said single porous layer means, said plurality of discrete drag elements comprising a plurality of spaced apart, twisted flat strips extending in a generally vertical direction from said upper surface to said lower surface of said single porous layer means.

2. A ground environment mat comprising:

a single porous layer means for permitting vertical entry of jet flows and controlling ground jet flows in all horizontal radial directions within said single porous layer means, said single porous layer means having a height and comprising:

an upper boundary sufficiently porous to permit vertical jet entry into said single porous layer means while subsequently preventing substantially a ground jet escape therefrom, a lower boundary, a plurality of rigid discrete drag elements, each of said plurality of rigid discrete drag elements substantially spanning, in use, said height of said layer means, each of said plurality of rigid discrete drag elements being hingedly attached to said lower boundary and being deployable according to an action of a ground jet.

3. A ground environment mat according to claim 2, wherein:

said plurality of rigid discrete drag elements are triangular planar members each having a plurality of holes formed therethrough.

4. A ground environment mat according to claim 2, wherein:

said plurality of rigid discrete drag elements are arranged in symmetrical patterns on said lower boundary.

5. A ground environment mat comprising:

a porous core element including a plurality of parallel perforated metal tubular sections arranged in two groups which intercept in a "V" formation at a center line of said ground environment mat.

6. A ground environment mat according to claim 5, further comprising:

a porous metal Upper layer; and a substantially impermeable lower layer:

said plurality of parallel perforated metal tubular sections being sandwiched between said porous metal upper layer and said substantially impermeable lower layer.

7. A ground environment mat comprising:

a single layer means for permitting vertical entry of jet flows and controlling ground jet flows in all horizontal radial directions within said single layer means, said single layer means having a height and comprising:

a plurality of discrete and substantially rigid drag elements, each of said plurality of discrete and substantially rigid drag elements spanning said height of said single layer means, an upper porous boundary which is sufficiently porous to permit vertical entry of jet flow into said single layer means while subsequently preventing substantially an escape of ground jet flows therefrom, and a lower boundary.

8. A ground environment mat according to claim 7, wherein:

a volumetric porosity of said single layer means is between 70% and 99%.

9. A ground environment mat according to claim 7, wherein said single layer means further comprises:

a porous upper surface connected to said plurality of discrete and substantially rigid drag elements, said porous upper surface having a porosity of at least 20% by area.

10. A ground environment mat according to claim 7, wherein said single layer means further comprises:

a substantially impermeable lower surface layer connected to said plurality of discrete and substantially rigid drag elements.

11. A ground environment mat according to claim 7, wherein:

each of said plurality of discrete and substantially rigid drag elements are a strip-like armature linking said upper porous boundary and said lower boundary of said single layer means, said strip-like armatures, said upper porous boundary, and said lower boundary of said single layer means being punched and drawn from one of a metallic material sheet, a plastic material sheet, and a composite material sheet.

12. A mat comprising:

a porous layer including a plurality of drag-inducing elements, said porous layer having a height and having a surface sufficiently porous to permit vertical entry of a jetflow within said porous layer amongst said plurality of drag-inducing elements, said plurality of drag-inducing elements spanning said height of said porous layer and being constructed and arranged to suppress said jetflow within said porous layer in all horizontal radial directions.

13. A ground environment mat comprising:

an upper porous surface which is sufficiently porous to permit vertical jet flow thereinto;

a lower surface; and a plurality of discrete drag elements spanning a height between said upper porous surface and said lower surface;

said upper porous surface, said plurality of discrete drag elements, and said lower surface controlling ground jet flows in all horizontal radial directions within said upper porous surface, said plurality of discrete drag elements, and said lower surface, while subsequently preventing substantially an escape of jet flows therewithin.

14. A ground environment mat according to claim 13, wherein:

a volumetric porosity of said discrete drag elements spanning said height between said upper porous surface and said lower surface is between 70% and 99%.

15. A ground environment mat according to claim 13, wherein:

said porous upper surface has a porosity of at least 20% by area.

16. A ground environment mat according to claim 13, wherein:

said lower surface is substantially impermeable.

17. A ground environment mat according to claim 13, wherein:

each of said plurality of discrete and substantially rigid drag elements are a strip-like armature linking said upper porous surface and said lower surface, said strip-like armatures, said upper porous surface, and said lower surface being punched and drawn from one of a metallic material sheet, a plastic material sheet, and a composite material sheet.

* * * * *